United States Patent [19]

Chang et al.

[11] 4,085,092

[45] Apr. 18, 1978

[54] TRANSPARENT, OPTICALLY CLEAR POLY(LACTONE-URETHANE) INTERLAYERS FOR LAMINATED SAFETY GLASS

[75] Inventors: Wen-Hsuan Chang, Gibsonia; Vernon G. Ammons, Glenshaw, both of Pa.

[73] Assignee: PPG Industries, Inc., Pittsburgh, Pa.

[21] Appl. No.: 728,372

[22] Filed: Sep. 30, 1976

Related U.S. Application Data

[63] Continuation-in-part of Ser. No. 474,645, May 30, 1974, Published Application No. B 474,645, abandoned.

[51] Int. Cl.² ............... C08G 18/64; C08G 18/65; C08G 18/75; B32B 27/40
[52] U.S. Cl. ............... 260/77.5 AN; 260/858; 260/860; 260/77.5 AT; 428/425
[58] Field of Search ............... 260/77.5 AN

[56] References Cited

U.S. PATENT DOCUMENTS

| B 474,645 | 3/1976 | Chang | 201/775 |
|---|---|---|---|
| 3,186,971 | 6/1965 | Hostettler et al. | 260/77.5 |
| 3,931,113 | 1/1976 | Seeger et al. | 260/77.5 AN |

*Primary Examiner*—H.S. Cockeram
*Attorney, Agent, or Firm*—William J. Uhl

[57] ABSTRACT

Energy-absorbing interlayers and glass laminates prepared therefrom for use as automobile windshields and other safety glass applications are disclosed. The interlayers are made from a poly(lactone-urethane) in which the molecular weight and structure of the lactone moiety is carefully controlled so as to get optimum energy-absorbing and optical properties.

17 Claims, No Drawings

TRANSPARENT, OPTICALLY CLEAR POLY(LACTONE-URETHANE) INTERLAYERS FOR LAMINATED SAFETY GLASS

CROSS-REFERENCE TO RELATED APPLICATIONS

This application is a continuation-in-part of application Ser. No. 474,645, filed May 30, 1974, published as United States Published Patent Application B474,645 on Mar. 2, 1976, and subsequently abandoned.

BACKGROUND OF THE INVENTION

1. Field of the Invention

This invention relates to polyurethane interlayers and to laminated glass articles prepared therefrom.

2. Description of the Prior Art

Safety glass is a well-known term for a glass sandwich composed of a plastic interlayer bonding together two glass sheets so that the breakage of the glass results in minimum dispersion of fragments of broken glass. Laminated glass is used widely in automobiles and must possess a number of properties, among which are: (1) a high impact energy absorption level so as to minimize concussive injury; (2) a shear and tear strength sufficient to prevent rupture from the broken glass; (3) sufficient adhesion to the glass in order to inhibit laceration and prevent broken pieces of glass from flying about and injurying anyone nearby; and (4) good optical transparency.

One difficulty encountered in present-day windshields is that upon breaking, sharp glass edges develop which can result in severe lacerative injuries. Bilayer windshields comprising an outer ply of glass and an inboard ply of plastic have been suggested for minimizing lacerative injury. However, since the plastic layer will be exposed to the atmosphere, it must have excellent weathering properties, retaining its optical clarity and energy-absorbing properties upon exposure to the ambient atmosphere.

Since about 1930, plasticized polyvinyl butyral has been the most widely used interlayer material. However, its use has been restricted to trilayer windshields in which the polyvinyl butyral interlayer is sandwiched between two outer plies of glass. Polyvinyl butyral is particularly sensitive to moisture and will haze upon prolonged exposure to the ambient atmosphere thus negating its use in bilayer windshield configurations. In addition, polyvinyl butyral has extremely poor energy-absorbing properties at low temperature, that is, about 0° to 30° F. (−18° to −1° C.).

There has been a trend in recent years to provide a substitute plastic interlayer material for polyvinyl butyral. U.S. Pat. Nos. 2,333,639; 2,864,780; 2,601,312; 3,226,354; 3,388,032; 3,522,142; 3,620,950 and Belgian Pat. No. 785,125 all disclose the use of various polyurethanes for use in fabricating motor vehicle safety glass. The polyurethane materials in general offer improved physical properties over polyvinyl butyral in that they have better impact resistance at both high and low temperatures. There are, however, a number of disadvantages associated with certain of the above-mentioned polyurethanes. A particular disadvantage is that many of the polyurethane formulations bloom or develop hazy surface appearance upon exposure of the interlayer to the ambient atmosphere. This bloom reduces the optical transparency and curtails the desirability of such materials for use in bilayer laminate configurations.

Also, many of the aforementioned polyurethanes have extremely short pot lives, because high mix temperatures must be used to keep the reactants in melt form and the reaction mixture homogeneous. Usually after the polyurethane-forming reactants are initially mixed together, they polymerize to a gel very quickly, thereby minimizing their use for forming interlayers in safety glass laminates by the casting and curing-in-place technique such as disclosed in U.S. Pat. No. 3,522,142 mentioned above.

SUMMARY OF THE INVENTION

It has now been discovered that polyurethanes comprising the polymerizate of:
 a. an organic polyisocyanate,
 b. a polylactone polyol having a hydroxyl number between 62 to 140, preferably 75 to 120, formed from polymerizing an unsubstituted lactone having 6 to 8 carbon atoms with an organic polyhydroxyl-containing compound selected from the class consisting of:
  1. aliphatic diols free of alkyl substitution and oxyalkylated products of these diols,
  2. a hydroxyl-terminated polyester having a hydroxyl number below 600 formed from an organic polycarboxylic acid containing from 3 to 10 carbon atoms and aliphatic diols free of alkyl substitution and oxyalkylated products of these diols, and
 c. a compound containing at least two active hydrogens per molecule reactive with isocyanate groups and having a molecular weight less than 250 selected from the class consisting of aliphatic diols free of alkyl substitution, aliphatic triols and mixtures thereof (commonly called chain extenders or curing agents), have high energy-absorbing properties over a wide temperature range and show surprising resistance to blooming upon exposure of the interlayer to the atmosphere.

In an embodiment of the invention, the organic polyhydroxyl-containing compound is a hydroxy-terminated polyester having a hydroxyl number below 600 formed from an organic polycarboxylic acid or anhydride thereof containing from about 3 to 10 carbon atoms and aliphatic polyols containing from 2 to 10 carbon atoms free of alkyl substitution and oxyalkylated products of these polyols. Preferably, the polyol is selected from the class consisting of aliphatic diols free of alkyl substitution. When the hydroxy-terminated polyester ring opens a lactone having 6 to 8 carbon atoms, the resulting polylactone polyol is a liquid at room temperature, that is, about 20° to 30° C., or a low melting solid which after melting can be cooled to room temperature without crystallization for a long period of time. Surprisingly, the liquid polylactone polyol is usually miscible with other reactants, that is, organic polyisocyanates and chain extenders or curing agents. This feature enables all the reactants to be mixed at room temperature, a critical processing advantage. The mixture of reactants often has a long pot life at room temperature, usually of at least 18 hours.

DETAILED DESCRIPTION

The diisocyanate moiety of the polyurethane polymerizate of the present invention is preferably an aliphatic diisocyanate and more preferably a cycloaliphatic diisocyanate such as 4,4'-methylene-bis-(cyclohexyl isocyanate). Most preferably, the diisocyanate is 4,4'-methylene-bis-(cyclohexyl isocyanate) wherein about 55 percent of the NCO groups are trans and about 45 percent of the NCO groups are cis. When such a diisocyanate is used with the polylactone polyols having a hydroxyl number of 62 to 140 and the preferred chain extenders such as 1,4-butanediol, superior clear compositions are obtained. Polyurethanes made with aromatic diisocyanates such as toluene diisocyanate and 4,4'-methylene-bis-(phenyl isocyanate) are less preferred because these compositions are more subject to ultraviolet light degradation. This limits their use for automotive safety glass, for bilayer laminates comprising one layer of glass and one layer of polyurethane, although they are inexpensive and may be applicable for trilayer laminates comprising two layers of glass sandwiching a layer of polyurethane. However, polyurethanes derived from aliphatic diisocyanates, particularly cycloaliphatic diisocyanates, are not adversely affected by ultraviolet light and have high impact energy-absorption levels over a wide temperature range which makes them desirable for bilayer safety glass applications.

In addition to the preferred 4,4'-methylene-bis-(cyclohexyl isocyanate) wherein about 55 percent of the NCO groups are trans and about 45 percent of the NCO groups are cis, other dinuclear cyclic aliphatic diisocyanates which can be used to prepare the polyurethane polymerizates of the present invention are those which are formed through an alkylidene bridging group of from 1 to 3 carbon atoms, inclusive, and which can be ring substituted with nitro, chloro, alkyl, alkoxy and other groups which are not reactive with hydroxyl groups or active hydrogens providing they are not positioned to render the isocyanate group unreactive. Another example of the preferred dinuclear cyclic aliphatic diisocyanate is 4,4'-isopropylidene-bis-(cyclohexyl isocyanate). An example of the preferred mononuclear cyclic aliphatic diisocyanate is 1,4-cyclohexyl diisocyanate. Also, hydrogenated aromatic diisocyanates such as hydrogenated toluene diisocyanate may be employed. In addition to the most preferred cyclic aliphatic diisocyanates, straight chain aliphatic diisocyanates such as 1,4-tetramethylene diisocyanate, 1,6-hexamethylene diisocyanate and 1,10-decamethylene diisocyanate can be employed. Suitable aromatic diisocyanates include the mononuclear types such as 2,4-toluene diisocyanate, 2,6-toluene diisocyanate and commercial mixtures comprising 80 percent of 2,4-toluene diisocyanate and 20 percent 2,6-toluene diisocyanate as well as a 65/35 mixture; and meta-phenylene diisocyanate; dinuclear aromatic diisocyanates such as 4,4'-phenylene diisocyanate and 1,5-naphthalene diisocyanate; alkyl substituted diisocyanates such as 3,3'-dimethyl-4,4'-diphenylene diisocyanate; xylene diisocyanates; aromatic cycloaliphatic diisocyanates such as 1,5-tetrahydronaphthalene diisocyanate; polynuclear aromatic diisocyanates bridged through aliphatic groups such as dimethylene tris(phenyl isocyanate), 4,4'-methylene-bis-(3-methylphenyl isocyanate).

Thioisocyanates corresponding to the above diisocyanates can be employed as well as mixed compounds containing both an isocyanate and a thioisocyanate group.

The polylactone segments in the polyurethane polymerizate described above are derived from polylactone polyols which are formed by polymerizing unsubstituted lactones in the presence of an organic polyhydroxyl-containing compound. The weight ratio of lactone to organic polyhydroxyl-containing compound is about 30 to 0.2:1, preferably 20 to 0.3:1, depending somewhat on the molecular weights of the starting lactone and organic polyhydroxyl-containing compound and the equivalency of the latter.

The polylactone polyols which are obtained from the above reaction are characterized by the presence of terminal hydroxyl groups and recurring moieties,

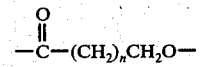

wherein $n$ is at least 4, preferably from 4 to 6.

Polymerization of the lactone and the organic polyhydroxyl-containing compound is conducted at a temperature of above 40° C., preferably between 120°-200° C., and preferably in the presence of an ester interchange catalyst such as organic titanium compounds or inorganic acid catalyst to accelerate the reaction. Examples of suitable catalyst include tetraisopropyl titanate and tetrabutyl titanate, para-toluene sulfonic acid, phosphoric acid and sulfuric acid. Catalyst concentrations of between 0.001 to 0.5 percent by weight based on weight of starting material are suitable. A catalyst concentration of 0.01 to 0.2 percent by weight is preferred.

The lactone used as a starting material may be any unsubstituted lactone, or combination of lactones, having at least 6 carbon atoms, for example, from 6 to 8 carbon atoms in the ring. The lactone used as the starting material can be represented by the following general formula:

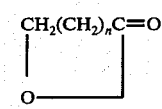

wherein $n$ is at least 4, preferably 4 to 6.

The lactone preferred in the practice of the invention is the epsilon-caprolactone in which $n = 4$ in the above structure. Epsilon-caprolactone is preferred because it is readily available in commercial quantities and gives the best energy-absorbing properties to resultant poly(lactone-urethane) interlayers and to laminates prepared therefrom. Lactones having more than six carbon atoms in the ring, for example, zeta-enatholactone and eta-capryolactone, may also be used. The various lactones may be utilized individually or in combination.

Polymerization of the lactone is initiated by reaction with organic polyhydroxyl-containing compounds. Organic polyhydroxyl-containing compounds which are preferred are aliphatic diols free of alkyl substitution, i.e., $HO-(CH_2)_w-OH$ wherein $w = 2$ to 10, and oxyalkylated products of these diols. The hydroxyl numbers of the oxyalkylated products of the diols are less than 1,000 and preferably within the range of 1,000 to 225. Alkyl substitution in the aliphatic diols is not preferred because, surprisingly, such substitution seems to lower the energy-absorbing properties, particularly at low temperature, of the resultantly prepared poly(lactone-urethane) interlayers and laminates.

Examples of suitable aliphatic diols include ethylene glycol, 1,3-propanediol, 1,4-butanediol, 1,5-pentanediol, 1,6-hexanediol and 1,10-decanediol. An example of an oxyalkylated product of the diols is ethylene oxide ring opened with 1,6-hexanediol in the presence of suitable catalyst.

A preferred organic polyhydroxyl-containing compound for ring opening the lactone ring is a hydroxy-terminated low molecular weight polyester having a hydroxyl number below 600 and preferably between about 140 to 300. Polyesters having hydroxyl numbers less than 140 are not preferred because of an increasing tendency of the subsequent polyurethane to bloom. Polyesters having hydroxyl numbers much above 300 are not preferred because when these very low molecular weight polyesters are reacted with the lactone, the adducts tend to be higher melting and have lower compatibility with the other reactants in the urethane systems. Thus, high temperatures must be used for mixing and short pot lives result.

The hydroxy-terminated low molecular weight polyester which is reacted with the lactone is a resinous material, i.e., not a gel, and the condensation reaction product of an organic polycarboxylic acid or anhydride thereof containing from 3 to 10 carbon atoms and a polyol selected from the class consisting of aliphatic diols free of alkyl substitution, i.e., HO—$(CH_2)_u$—OH, wherein $u = 2$ to 10, and oxyalkylated products of these diols. The acid number of the polyester is less than 10 and preferably less than 5.

Preferred organic polycarboxylic acids (and their anhydrides) are aliphatic dicarboxylic acids and include aliphatic dicarboxylic acids having from 3 to 10 carbon atoms in which the aliphatic moiety is an alkylene group. Examples include malonic, succinic, methyl succinic, glutaric, adipic, pimelic, suberic, azelaic and sebacic acids.

Also, a minor amount of alicyclic and aromatic diacids or their anhydrides can be used. Examples include phthalic acids, hexahydrophthalic acids and their anhydrides.

Also, limited amount of polycarboxylic acids containing 3 or more carboxylic acid groups can be used, but their use is not preferred.

Preferred polyols used to prepare the hydroxy-terminated low molecular weight polyester are aliphatic diols free of alkyl substitution containing from 2 to 10 carbon atoms and oxyalkylated products of these diols. Alkyl substitution in the aliphatic diol used to prepare the low molecular weight polyester is not preferred. Surprisingly, such substitution seems to lower the energy-absorbing properties, particularly at low temperature, of the resultantly prepared poly(lactone-urethane) interlayers and laminates. Examples of suitable aliphatic diols include ethylene glycol, 1,4-butanediol, 1,5-pentanediol, 1,6-hexanediol, 1,8-octanediol and 1,10-decanediol. Examples of oxyalkylated products of diols are ethylene oxide ring opened with 1,6-hexanediol in the presence of a suitable catalyst.

The organic polyhydroxyl-containing compound is believed to open the lactone ring to produce an ester having two or more terminal hydroxyl groups that are capable of opening further lactone rings and thereby adding more and more lactone moieties to the molecules. Taking an alkylene diol in which alkylene moieties contain from 2 to 10 carbon atoms or oxyalkylated products of these diols as an example, the polymerization is believed to take place somewhat as follows:

$$HO-R'''-OH + CH_2-(CH_2)_n-C=O \text{ (with O bridge)} \longrightarrow$$

$$HO-CH_2-(CH_2)_n-C-O-R'''OH$$
$$\parallel$$
$$O$$

$$HO-(CH_2)-(CH_2)_n-C-O-R'''OH + (x+y-1)\ CH_2-(CH_2)_n-C=O$$
$$\parallel$$
$$O$$

$$\longrightarrow HO+CH_2-(CH_2)_n-\overset{O}{\underset{\parallel}{C}}-O+_x R'''-O+\overset{O}{\underset{\parallel}{C}}-(CH_2)_n-CH_2-O+_y H$$

wherein $n$ has a meaning designated above and $R'''$ is derived from alkylene diols containing from 2 to 10 carbon atoms or oxyalkylated products of these diols, with $x + y$ being a number that ranges from 2 to 16 and preferably 4 to 8.

A polyester polyol opens the lactone ring in the same manner as other organic polyhydroxyl-containing compounds do. Using a polyester diol formed from an aliphatic dicarboxylic acid or anhydride thereof containing from 3 to 10 carbon atoms and an alkylene diol containing from 2 to 10 carbon atoms or oxyalkylated products of these diols containing from 2 to 10 carbon atoms in the oxyalkyl moiety as an example of an initiator, the polymerization is believed to take place somewhat as follows:

$$HO+R'-O-\overset{O}{\underset{\parallel}{C}}-R''-\overset{O}{\underset{\parallel}{C}}-O+_m R'-OH + (x + y)\ CH_2-(CH_2)_n-C=O$$

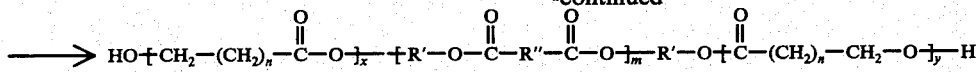

where $m$ has a value of 1 to 6, R" is an aliphatic moiety containing from 3 to 10 carbon atoms and in which R' is derived from alkylene diols containing from 2 to 10 carbon atoms or oxyalkylated products of these diols, and $n$ and R have meanings as mentioned above. In the final structure, the value $x + y$ ranges from 2 to 16 and preferably from 4 to 8. Preferably the radical

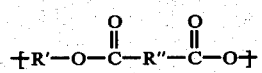

has a unit weight of from about 172 to 228.

The hydroxyl number of the polylactone polyols should range between about 62 to about 140, preferably between 75 to 120. Hydroxyl numbers within this range have been found to give resultantly prepared polyurethanes the most desirable energy-absorbing properties in conjunction with superior optical quality. Polyurethanes from polylactone polyols with hydroxyl numbers above 140 tend to be somewhat low in tensile strength and have poor energy-absorbing characteristics. Hydroxyl numbers much below 62 tend to bloom after exposure to atmospheric conditions. With polylactone diols, hydroxyl numbers within the range of 140 to 62 and 120 to 75 correspond to number average molecular weights of 800 to 1800 and 900 to 1500, respectively.

The hydroxyl number can be determined by adding pyridine and acetic anhydride to the polyol and titrating the acetic acid formed with KOH as described in *Ind. Eng. Chem. Anal.*, Ed. 16, 541–49, and *Ind. Eng. Chem. Anal.*, Ed. 17, 394 (1945). The hydroxyl number is defined as the milligram of KOH per gram of polyol.

The number average molecular weights of the polylactone diols can be determined by hydroxyl number and the formulation:

$$\text{Number Average Molecular weight} = \frac{(2)(56.1)(1000)}{\text{hydroxyl number of polylactone diol}}$$

Useful polylactone polyols are light in color, are liquid or waxy solids at room temperature and have acid values less than 10 and preferably less than 3.

The third component of the polyurethane polymerizate is a compound containing at least two active hydrogens per molecule reactive with isocyanate groups and having a molecular weight less than 250. These materials are conventionally recognized in the art as chain extenders or curing agents. By active hydrogen is meant a hydrogen which evidences activity in accordance with the Zerewitinoff test as described by Kohler in *Journal of the American Chemical Society*, 49 3181 (1927). The third component should have molecular weights of less than 250, preferably within the range of 62 to 215. Preferred chain extenders or curing agents are aliphatic diols free of alkyl substitution and aliphatic triols containing from 2 to 15 carbon atoms. Alkyl substitution in the aliphatic diols is not preferred because such compounds seem to lower the energy-absorbing properties of the resultantly prepared poly(lactone-urethane) interlayers and laminates, particularly at low temperature. Examples of aliphatic diols include ethylene glycol, 1,3-propanediol, 1,4-butanediol, 1,5-pentanediol and 1,6-hexanediol. Examples of aliphatic triols include trimethylol propane and trimethylol ethane. Mixtures of diols and triols can also be used, for example, 1,4-butanediol and trimethylol propane.

The overall functionality per unit weight of the reactive system is important as a highly branched polymerizate is undesirable. Accordingly, the combined functionality of a mixture of the polylactone polyol and the chain extender or curing agent is two or more, there being present not more than about one gram-mole of polyols having a functionality of 3 or more per 500 grams of total weight of the mixture.

Proportions of the above-mentioned ingredients, that is, polyisocyanate and polylactone polyol which are employed, will depend upon the particular ingredients themselves and their molecular weight. In any event, the total number of active hydrogen atoms, as determined by the Zerewitinoff test as described above, is approximately equivalent to the number of isocyanate groups. In other words, the NCO to active hydrogen ratio is generally between about 0.9–1.1 to 1 and preferably 1 to 1. The equivalent ratio of polyisocyanate to polylactone polyol to chain extender or curing agent should broadly fall within the following ranges:

| Component | Equivalent Ratio | |
|---|---|---|
| | Broad Range | Preferred Range |
| organic polyisocyanate | 1.35 – 4.4 | 1.65 – 2.35 |
| polyacetone polyol | 1.000 | 1.000 |
| chain extender or curing agent | 0.5 – 3 | 0.65 – 1.35 |

The higher the molecular weight of the polylactone polyol, the more of the chain extender which should be employed. Polyurethanes prepared with higher molecular weight polylactone polyols with insufficient chain extender have a tendency to be soft, making the urethanes unsuitable for motor vehicle glazing applications. With lower molecular weight polylactone polyols, less chain extender is necessary. Chain extending these polymers with a lower molecular weight compound containing at least two active hydrogens would introduce too high a urethane content into the polymer, making it too stiff and rigid for automotive glazing applications.

The proportions of polylactone polyol and chain extender relative to one another are determined as mentioned above, principally by the hydroxyl number of the polylactone polyol. In general, urethane contents of about 11 to 18, preferably 13 to 16 percent are desirable for optimum impact properties. By urethane content is meant the weight percent

linkages in the polymer. Within the polylactone polyol molecular weight ranges employed in the present invention, the mole ratio of chain extender, such as 1,4-butanediol, to polylactone polyol should be about 0.5–3:1.

The poly(lactone-urethanes) for interlayers and for laminates of the invention can be prepared in several ways, namely, by the prepolymer method or by the "one-shot" method, both of which are well known in the art. The "one-shot" method is preferred to the prepolymer method because it is simpler and because of lower initial viscosity of reactants. In the "one-shot" method, all the ingredients, that is, polyisocyanate, polylactone polyol and chain extender or curing agent and catalyst if needed and optional ingredients such as ultraviolet light stabilizers and adhesion modifiers which will be described below, are mixed together. Mixing is preferably conducted under anhydrous conditions with dry reactants such as in a nitrogen atmosphere at atmospheric pressure and at a temperature between about 20 and about 145° C., preferably at about room temperature. The polylactone diols are dried before reaction, usually to a moisture content of between about 0.01 to 0.05 percent.

The curing agent or chain extender is preferably added to the polylactone polyol under a nitrogen atmosphere to exclude the moisture. The temperature is maintained sufficiently high so that there is no phase separation and a homogeneous mixture is obtained. The polyisocyanate is preferably added rapidly to the mixture of polylactone polyol and chain extender or curing agent and the temperature of the mixture maintained so that there is no phase separation and the mixture remains homogeneous. The mixture is then preferably vigorously agitated and degassed for a period of at least about 8 minutes during which time the pressure is reduced from atmospheric to about 3 millimeters of mercury. The reduction in pressure facilitates the removal of dissolved gases such as air and carbon dioxide. The ingredients are then removed from the reaction kettle and then further processed and reacted. The reaction continued until there are substantially no free NCO groups. The free NCO content of the thermoplastic polymer will be less than 0.05 percent by weight isocyanate groups and preferably less than 0.01 percent by weight.

The thermoplasticity or the thermosetting characteristics of the polymer will determine how it is further processed. If the polymer is made with all difunctional reactants, for example, polylactone diols and diol chain extenders, the polymer can be further processed by conventional thermoplastic techniques. For example, the ingredients, after removal from the reaction kettle, can be transferred directly to an extruder and extruded to the desired thickness allowing for further polymerization in the extruder. Alternately, the reaction mixture instead of being added directly to the extruder, can be conducted onto a suitably heated surface such as a table or conveyor preferably maintained at a temperature of from about 140° to 150° C. until it is fully polymerized. A fully cured or polymerized product is evidenced by essentially no residual NCO as determined by infrared spectrophotometry. The fully polymerized material may then be ground into chunks and be further processed to interlayer form by conventional thermoplastic techniques such as extrusion, milling or calendering. Also, the thermoplastic material can be cast in place, for example, between two sheets of glass or other suitable material, such as described below.

The thermoplastic poly(lactone-urethanes) of the present invention in extruded sheet form can then be laminated to other sheets such as rigid transparent sheets such as glass or polycarbonate or to other flexible sheets such as polyvinyl butyral by laminating techniques well known in the art. See, for example, U.S. Pat. No. 3,808,077 to R. Rieser et al.

Thermosetting materials are generally made with polylactone polyols and/or polyol curing agents and polyisocyanates having a functionality greater than two. With thermosetting materials, thermoplastic processing techniques such as extrusion, milling and calendering cannot be used. Usually, the thermosetting polymers are further processed after removal of the liquid ingredients from the reaction kettle and casting and curing. Casting and curing in place involves removing the ingredients from the reaction kettle and casting material as a liquid in a casting cell and permitting it to cure in place within the casting cell. Casting can be conveniently accomplished by using an automatic dispensing apparatus such as described in French Patent No. 2,072,718. Also see U.S. Pat. No. 3,522,142 to Wismer et al for laminating by casting and curing thermosetting polyurethanes in place.

In general, casting and curing in place permits laminates to be formed directly without any separate laminating operation. For example, when a trilayer laminate comprising two outer plies of glass sandwiching a layer of polyurethane is desired, the casting cell is comprised of two spaced-apart glass sheets. Upon casting and curing of the polyurethane in place between the two glass sheets, a trilayer laminate results. For a bilayer laminate, one interior surface of the casting cell should be coated with a release agent so that after the resinous interlayer material has been cast and cured in place, the glass sheet with the release surface can be easily separated from the cured interlayer material. To form the free cast sheets, both interior surfaces of the casting cell would be coated with a release agent and laminating could be conducted with the free interlayer sheet as described above.

In the cast-in-place technique for making laminated windows, in which a liquid polyurethane-forming reaction mixture is cast between a pair of rigid sheets and cured in place to form the resultant laminated window, reaction mixtures with short pot lives are extremely troublesome. Pressure is not only needed to remove the reaction mixture from the reaction kettle, but it is also necessary to be sure that the reaction mixture is completely transferred to the casting cell before gelling occurs. If the mixture should attain too high a viscosity before transfer is complete, a striated interlayer will result.

It has been found that the interlayer compositions of the present invention in which the lactone is ring opened with hydroxy-terminated low molecular weight polyesters have extremely long pot lives (up to 18 hours or more) and low viscosities, and can be mixed together at room temperature, that is, about 0° to 30° C., and thus can be used in the cast-in-place technique without fear of premature gelling or encountering other problems which plague polyurethanes having very short pot lives.

The poly(lactone-urethanes) of the invention can be characterized as plastomers, that is, they are elastoplastic and thus do not snap back as a true elastomer when stretched. In addition, they are clear, flexible and essentially non-adhesive at room temperature. The fully cured thermoplastic poly(lactone-urethanes) preferably have an inherent viscosity at 30° C. in a 0.5 percent solution of silica stabilized chloroform of between about 0.80 and 1.4, preferably between about 1.1 to 1.3. Poly(- lactone-urethanes) of the invention have decomposition temperatures of about 190° to 200° C.

The poly(lactone-urethanes) of the present invention are desirable for use as interlayers for automotive and airplane safety glass windows. As such, they should be transparent and optically clear. In interlayer form for automotive windshield use, the poly(lactone-urethanes) of the present invention meet the standard requirement of minimum light transmission for use in automotive windshields, that is, about 70 percent, and preferably have a minimum light transmission of 86.5 percent or above (Illuminant A, Tungsten Lamp 2840° K) and less than 2 percent haze (ANSI Code Z-26.1, 1966, Test No. 18). The percent light transmission and percent haze can be measured by a Hunter Pivotable Sphere Haze Meter. For other safety glass applications such as architectural applications, the interlayer can be tinted or made opaque by pigmenting, if desired.

It has been found that many polyurethane interlayers of the prior art bloom, or, in other words, develop a hazy surface appearance upon exposure of the interlayer to atmospheric conditions. Also, it has been found that when the poly(lactone-urethanes) are prepared with polylactones having hydroxyl numbers of much below 62, interlayers prepared from such polymers bloom or develop a hazy surface appearance upon exposure of the interlayer to atmospheric conditions. The cause or nature of the bloom is not completely understood, although it is not evidenced when the hydroxyl number of the polylactone diol is maintained at 62 or above. With a hydroxyl number of about 56, a slight detection of the bloom is observed as will be pointed out more fully in the working examples which follow. Also, bloom may appear if the reactants used in preparing the polyurethane are not pure. The reactants should be purified before use such as by distillation. Also, when additives and catalyst are included with the reactants such as adhesion modifiers and tin catalyst mentioned infra, they should be compatible with the reactants, that is, form a solution with the reactants and not phase separate.

The bloom can be removed from the surface of the interlayer by cleaning with a suitable solvent such as petroleum ether. However, the bloom will return upon continued exposure of the interlayer to the atmosphere. The bloom is unsightly, making the interlayer unattractive for commercial use such as motor vehicle windshields and presents a distinct danger in that it reduces the overall light transmitted through the interlayer. The haze problem is of particular concern in bilayer safety glass viewing closures where one major surface of the polyurethane is exposed to the atmosphere. The bloom will form on the exposed surface. With trilayer safety glass closures, on the other hand, in which the polyurethane is sandwiched between two layers of glass, bloom will not be a problem because both major surfaces are not exposed to the atmosphere, provided, of course, the interlayer is laminated before bloom develops on the free interlayer sheet.

In accordance with the present invention, it is possible to prepare laminates with poly(lactone-urethane) interlayers, and laminates prepared therefrom are essentially free of bloom, e.g., non-blooming. By the term non-blooming is meant that the interlayer itself or a bilayer or polylayer laminate consisting of a rigid transparent sheet such as polycarbonate, acrylic or glass with or without an intermediate layer such as polyvinyl butyral laminated to a poly(lactone-urethane) interlayer with one major surface of the interlayer being exposed to the atmosphere will not bloom upon extended exposure, i.e., 90 days or more, of the interlayer to atmospheric conditions. Nominally, atmospheric conditions can be taken as a temperature of 25° C., 50 percent relative humidity, and one atmosphere of pressure. Bloom can be determined visually by the human eye as a haziness which appears on the surface of the interlayer due to light scattering. A quantitative measurement of bloom can be obtained by measuring haze of the interlayer with a Gardner Automatic Pivotable Sphere Haze Meter with an Illuminant "A" filter. Accordingly, bloom is evidenced when the percent haze due to bloom increases 5 percent or above upon exposure of the polyurethane interlayer to atmospheric conditions of 25° C., 50 percent relative humidity and one atmosphere of pressure for 90 days or more. Optically clear interlayers of the present invention preferably have haze values of less than 0.5 percent. Therefore, where the expression "non-blooming interlayer" is used in the claims, an optically clear polyurethane interlayer developing less than 5 percent haze upon exposure of the sheet to atmospheric conditions as defined above for 90 days or more is meant.

Bloom should be distinguished from internal haze which occurs when the poly(lactone-urethanes) are improperly prepared, such as by using improper formulations, reaction temperatures, or mixing techniques such as described above. Internal hazing is not a surface phenomena such as blooming is, but is a phenomena which occurs within the thickness of the sheet. Internal hazing can also occur in some cases when interlayers are subjected to strong ultraviolet light exposure and/or high humidity and temperature. Hazing from these sources may be due to polymer degradation which occurs within the thickness of the sheet and is distinguished from bloom which is a surface phenomena as described above.

The poly(lactone-urethane) interlayer of the invention in sheet form will usually vary in thickness between about 2 and 500 mils (0.005 and 1.27 cm), although somewhat thinner and thicker sheets can be used depending upon the application. It can be in the form of an extruded sheet formed from thermoplastic polymers and a cast sheet formed from both thermoplastic and thermosetting polymers.

For automotive and aircraft window uses, the polyurethane interlayer will usually vary between about 15 and 60 mils (0.038 and 0.152 cm). The poly(lactone-urethane) interlayer should be of substantially uniform thickness across its entire expanse to avoid differences in light diffraction. The thickness variations from edge to edge should be no more than ± 5 mils (0.013 cm), preferably no more than ± 2 mils (0.005 cm). Moreover, the rate of change in thickness within the interlayer should be sufficiently small to produce a diopter of less than 0.006 to avoid visible optical distortion in the resultant laminate due to variations in laminate refraction. For armor vehicle usage, thickness variations as described above are not as important.

The poly(lactone-urethanes) of the present invention can, of course, be used in the form of free sheets or films, but they are preferably laminated to other sheets to form composite laminated structures. Preferably, they are laminated to rigid transparent sheets such as glass, polycarbonate and acrylic to form laminated viewing closures such as windows for motor vehicles, aircraft and architectural application. Particularly preferred laminates are the poly(lactone-urethanes) laminated to glass such as trilayer laminates comprising two outer plies of glass sandwiching an interlayer of the poly(lactone-urethane). Such laminates are particularly useful in motor vehicle safety glazing such as a windshield. For windshield use, a particularly interesting laminate is a bilayer comprising an outer sheet of glass laminated to an inner sheet of the poly(lactone-urethane) of the present invention. Bilayer laminates have much greater safety performance than conventional trilayer laminates. Since the poly(lactone-urethanes) of the present invention are non-blooming, there is no danger of the interlayer hazing during use, a problem which plagues many of the polyurethane interlayers of the prior art.

Therefore, by the term interlayer is meant the poly(lactone-urethanes) of the present invention in sheet or film form having a thickness of from 2 to 500 mils (0.005 to 1.27 cm), and being suitable for use in glazing applications, that is, laminated to one or more transparent sheets.

The glass which can be employed in the laminates of the invention can be of any type, depending upon the intended use of the laminate, but preferably is a clear, low-colored, transparent type of glass, such as the well-known silica glass, particularly soda-lime-silica glass. The nature and composition of various soda glasses is known in the art and is described, for example, in the *Encyclopedia of Chemical Technology*, by Kirk-Othmer, published by Interscience Encyclopedia Inc., New York, New York, Vol. 7, pages 181–189. The glass can be strengthened by either thermal or chemical tempering.

The thickness of the glass can vary depending on the ultimate end use. Typically, the glass can have a thickness of from 50 to 500 mils (0.127 to 1.27 cm). For automobile and other motor vehicle window uses, the glass will preferably have a thickness between about 65 and 180 mils (0.165 and 0.457 cm).

Besides glass, other rigid transparent sheets, such as polycarbonate and acrylic sheeting, can be used to form the laminates of the present invention. Also, besides tri- and bilayer laminates, the polyurethane interlayers of the present invention can be used to make tri- and multi-ply laminates in which the interlayer of the present invention may be interposed between alternating rigid transparent sheets (e.g. glass, polycarbonate or acrylic). Also, the polyurethane interlayer of the present invention can be used in combination as a flexible ply between alternating layers of rigid transparent sheets in combination with other flexible plastic plies such as polyvinyl butyral. Such multi-ply laminates are useful as aircraft transparencies or as bullet-proof glass for armored vehicles. Also, the poly(lactone-urethanes) of the present invention could also be used as a partial replacement for the conventional polyvinyl butyral in motor vehicle windshields. In conventional windshields, a 30 mil (0.076 cm) thick interlayer sheet is sandwiched between two plies of glass. A 15 mil (0.038 cm) thick sheet of the poly(lactone-urethane) of the present invention could be used in combination with a 15 mil (0.038 cm) thick sheet of polyvinyl butyral to form the interlayer.

Since the poly(lactone-urethanes) of the invention are to be used in glass laminates, an adhesion promoter to promote and to maintain the adhesion of the polyurethane to glass may be necessary. Suitable adhesion promoters are alkoxy silanes such as gamma-glycidoxypropyltrimethoxysilane sold by Dow Corning Company under the trade name Z-6040. The promoter is preferably incorporated into the urethane reactants in concentrations of about 0.10 to 0.20 percent by weight based on total formulation weight.

In some cases, an adhesion-controlling agent or inhibitor may be necessary such as an alkyl acid phosphate such as disclosed in Canadian Patent No. 861,469. Particularly preferred is stearyl acid phosphate and lauryl acid phosphate which have been observed to effect the desirable controlled degree of adhesion to glass with excellent interlayer diaphragm action and glass retention when the laminate is impacted and fractured.

It has been found that when some laminates are prepared by the cast-in-place method, an adhesion inhibitor is necessary as this method produces laminates in which the urethane is quite strongly adhered to the glass. Inhibitors are preferably added to the urethane reactants and are present in concentrations of about 0.03 to 0.12 percent by weight based on total formulation weight.

In certain instances, particularly with bilayer safety glass laminates, an adhesion promotor and an adhesion inhibitor are desirable to use in combination. In this way, a desirable low degree of adhesion of the polyurethane to the glass is obtained, but yet this low degree of adhesion can be maintained under extremely high humidity conditions. A particularly desirable combination is from 0.01 to 0.12 percent by weight stearyl acid phosphate plus 0.2 percent by weight gamma-glycidoxypropyltrimethoxysilane. See, for example, U.S. Pat. No. 3,900,686 to Ammons et al.

The degree of adhesion between the polyurethane and the glass ply in bilayer laminates of the invention should be about 1 to 10 pounds per lineal inch ($1.75 \times 10^2$ to $1.75 \times 10^3$ N/m), preferably 3 to 7 pounds per lineal inch ($5.25 \times 10^2$ to $1.225 \times 10^3$ N/m) as determined by a 90° Peel Test according to NASA TECH BRIEF 65-10173. This adhesion is low enough to allow sufficient interlayer to release from the glass so that it can stretch without tearing to absorb impacting energy, yet the degree of adhesion is sufficient for retention of broken glass. Higher degrees of adhesion, that is, much higher than 10 pounds per lineal inch ($1.75 \times 10^3$ N/m), result in decreases in impact resistance and higher severity indices as will be described later. Lower degrees of adhesion, that is, lower than one pound per lineal inch ($1.75 \times 10^2$ N/m), are insufficient for commercial vehicle use in that delamination may occur, particularly under high humidity conditions.

In addition to a low initial degree of adhesion within the prescribed range, this degree of adhesion should be relatively stable under a wide range of temperature and humidity conditions. By relatively stable under a wide range of temperature and humidity conditions is meant that although there may be fluctuations in the adhesive value over a period of time, the degree of adhesion as determined by NASA TECH BRIEF 65-10173 remains within the 1 to 10 ($1.75 \times 10^2$ to $1.75 \times 10^3$ N/m), preferably within the 3 to 7 pound per lineal inch range ($5.25 \times 10^2$ to $1.225 \times 10^3$ N/m) after exposure to temperatures ranging from $-50°$ to $120°$ F. ($-46°$ to $49°$ C.) and relative humidities ranging from 0 to 100 percent for at least 5 days.

Poly(lactone-urethanes) of the present invention have excellent energy-absorbing properties over a wide temperature range. For example, when an approximately 0.030–0.040 inch ($0.0762 \times 10^{-2}$ to $0.1016 \times 10^{-2}$ m) thick poly(lactone-urethane) interlayer is laminated to a ⅛ inch thick (0.3175 × 10⁻² m) 12 inch by 12 inch (30.48 × 10⁻² m by 30.48 × 10⁻² m) float glass sheet to form a bilayer laminate, and the laminate is held rigid and impacted on the polyurethane side with a 5-pound (22.675 × 10⁻¹ kg) freely falling steel ball, as described in somewhat more detail below, the mean penetration velocity of the laminate at 0° F., 70° F. and 120° F. (−18° C., 21° C. and 49° C.) will be at least 20 miles per hour (mph) (32.180 km/hr). At 70° F. (21° C.), the mean penetration velocity will be at least 30 mph (48.270 km/hr), and preferably at least 35 mph (56.315 km/hr).

In discussing the energy-absorbing properties of the poly(lactone-urethane) interlayer of the invention and of the glass laminates prepared therefrom, reference will be made in the following examples to several test procedures employed to evaluate adhesion of the polyurethane ply to the glass ply to measure resistance of the laminate to penetration by impacting objects. Such tests are described below.

A method of determining the energy-absorbing properties of the poly(lactone-urethane) interlayers is to measure the impact resistance of bilayer glass laminates by the 5-pound (22.675 × 10⁻¹ kg) ball drop impact test. Reference is made to ANSI Code Z-26.1, 1966, for a discussion of this test.

The 22-pound (99.77 × 10⁻¹ kg) falling headform test can also be used to calculate impact resistance and a factor known as the Severity Index.

For a discussion of Severity Index, see "Human Tolerance to Impact Conditions as Related to Motor Vehicle Design" by the Society of Automotive Engineers Handbook Supplement J885, 1964; and "Use of a Weighted-Impulse Criteria for Estimating Injury Hazard" by J. P. Danforth and C. W. Gadd from the conference proceedings 10th *Stapp Car Crash Conference*, reprinted by the Society for Automotive Engineers, December 1966. For a discussion on the 22-pound (99.77 × 10⁻¹ kg) falling headform test, see "Laboratory Studies on Laminated Safety Glass and Installations on Performance" by R. G. Rieser and J. Chabal presented at the 13th *Stapp Car Crash Conference*, reprinted by the Society for Automotive Engineers, December 1969.

The present invention is more particularly described in the following examples which are intended as illustrative only since numerous modifications and variations therein will be apparent to those skilled in the art.

EXAMPLE I

A poly(lactone-urethane) interlayer was prepared from the following charge:

| Ingredient | Moles |
| --- | --- |
| 4,4'-methylene-bis-(cyclohexyl isocyanate) | 2.214 |
| polycaprolactone diol | 1.000 |
| polycaprolactone diol containing 1% by weight of dissolved butyl stannoic acid catalyst | 0.019 |
| 1,4-butanediol | 1.195 |
| gamma-glycidoxypropyltrimethoxy-silane | 0.20 percent by weight[1] |
| stearyl acid phosphate | 0.04 percent by weight[1] |

[1]Percent by weight based on total formulation weight.

The polycaprolactone diol was prepared by polymerizing epsiloncaprolactone (89.47 mole percent) with about 10.53 mole percent of 1,4-butanediol initiator. The resulting polycaprolactone diol had a hydroxyl number of 107.5 and a number average molecular weight of 1044. The polycaprolactone diol was melted at 60° C. and mixed with the polycaprolactone diol containing the catalyst and gamma-glycidoxypropyltrimethoxysilane and charged to a glass reaction kettle. The catalyst, butyl stannoic acid was present in an amount of 0.006 percent by weight based on total formulation weight. The ingredients in the reaction kettle were heated to a temperature of 60° C. for 30 minutes under 2-3 millimeters of mercury pressure to degas the mixture and to remove trace amounts of volatiles. Then the mix was allowed to cool to 43° C. The vacuum was released by introducing pre-purified nitrogen. Anhydrous 1,4-butanediol at a temperature of 43° C. was added while still stirring. Immediately following, 4,4'-methylene-bis-(cyclohexyl isocyanate) (HYLENE W) in a stereo:isomer ratio of 55 percent trans and 45 percent cis at 43° C. and containing the stearyl acid phosphate was added to the reaction kettle while stirring. The mixture was then degassed for 8 minutes while holding the temperature at 43° C. at a pressure of about 2 millimeters of mercury. The material was then cast in place between two 14 inch by 14 inch by ⅛ inch (35.56 × 10⁻² by 35.56 × 10⁻² by 0.3175 × 10⁻² m) float glass sheets which were fitted with gaskets on three sides. Both glass sheets had polytetrafluoroethylene release coatings on their faces which contacted the polyurethane. The spacing between the sheets was approximately 40 mils (101.60 × 10⁻⁵ m). The casting cell was preheated to a temperature of about 143° C. before casting and the cast assemblies were given a 7-hour cure at 143° C. After curing for this period and temperature, the cells were permitted to cool to room temperature and the polyurethane sheet was then removed from the casting cell and aged 1 week at about 20° C. and one atmosphere of pressure. The cured polyurethane was essentially free of NCO groups and had a urethane content calculated to be 14.8 percent. The polyurethane sheet was trimmed and placed on a 12 inch by 12 inch by ⅛ inch (30.48 × 10⁻² m by 30.48 × 10⁻² m by 0.3175 × 10⁻² m) float glass sheet and a piece of TEDLAR ® (registered trademark of E. I. du Pont de Nemours and Company) film was placed over the polyurethane and a 12 inch by 12 inch by ⅛ inch (30.48 × 10⁻² m by 30.48 × 10⁻² m by 0.3175 × 10⁻² m) float glass sheet was placed over the TEDLAR film. The assembly was then placed in a MYLAR ® (registered trademark of E. I. du Pont de Nemours and Company) bag and the bag and its contents placed in an evacuation chamber and evacuated at approximately 40 millimeters of mercury at room temperature to prepress the assembly. The vacuum bag assembly was then placed in an oil autoclave for 45 minutes at 150° C. and 200 pounds per square inch (1,378,800 Pa) pressure to laminate the assembly. After autoclaving, the assembly was broken apart to yield a 12 inch by 12 inch (30.48 × 10⁻² m by 30.48 × 10⁻² m) bilayer laminate. The 12 inch by 12 inch (30.48 × 10⁻² m by 30.48 × 10⁻² m) bilayer laminate was then subjected to a 5-pound (22.675 × 10⁻¹ kg) falling ball test as described above to determine the energy-absorbing properties of the poly(caprolactone-urethane) interlayer. Test results are given below for poly(caprolactone-urethane) thickness of 40 mils (101.60 × 10⁻⁵ m).

| Mean Penetration Velocity | | |
| --- | --- | --- |
| (5-Pound (22.675 × $10^{-1}$ kg) Ball Drop) | | |
| 0° F. (−18° C.) | 70° F. (21° C.) | 120° F. (49° C.) |
| 27.3 mph | 34.6 mph | 21 mph |
| (43.9257 km/hr) | (55.6714 km/hr) | (33.789 km/hr) |

Two foot by 3 foot (6.096 × $10^{-1}$ m by 9.144 × $10^{-1}$ m) bilayer laminates employing the above-described poly(caprolactone-urethane) were prepared as follows:

Instead of casting the liquid polyurethane in 12 inch by 12 inch (30.48 × $10^{-2}$ m by 30.48 × $10^{-2}$ m) casting cells, the polyurethane was cast between four sets of two each 14 inch by 14 inch by ¼ inch (35.56 × $10^{-2}$ m by 35.56 × $10^{-2}$ m by 0.635 × $10^{-2}$ m) float glass sheets, both sheets of which had a polytetrafluoroethylene release coating on the surfaces which contacted the polyurethane. The spacing between the sheets was approximately 40 mils (101.60 × $10^{-5}$ m). The four casting cells were preheated to 143° C. immediately before the polyurethane was cast. After casting, the polyurethane was given a cure of 7 hours at 143° C. followed by cooling to room temperature and aging for 1 week at 20° C. and one atmosphere of pressure. The polyurethane sheets were then removed from the casting cells and the sheets were pieced together on a 2 foot by 3 foot by 90 mil (6.096 × $10^{-1}$ m by 9.144 × $10^{-1}$ m by 228.60 × $10^{-5}$ m) float glass sheet. A piece of TEDLAR film was placed over the polyurethane sheets and then a 2 foot by 3 foot by 90 mil (6.096 × $10^{-1}$ m by 9.144 × $10^{-1}$ m by 228.60 × $10^{-5}$ m) float glass sheet was placed over the TEDLAR film. This assembly was then placed in a MYLAR bag and the bag and its contents placed in an evacuation chamber and evacuated at approximately 40 millimeters of mercury at room temperature to prepress the assembly. The vacuum bag assembly was then placed in an oil autoclave for 45 minutes at 150° C. and 200 pounds per square inch (1,378,800 Pa) pressure to laminate the assembly. After autoclaving, the assemblies were broken apart to yield 2 foot by 3 foot (6.096 × $10^{-1}$ m by 9.144 × $10^{-1}$ m) bilayer laminates. The bilayers were stored 5 to 7 days in a controlled humidity room at 20° C. approximately 25 percent relative humidity and then given 22-pound (99.77 × $10^{-1}$ kg) falling headform impact testing as described generally above. The testing was conducted at 30° F., 70° F. and 110° F., 19 miles per hour (−1° C., 21° C. and 43° C., at 30.571 km/hr). At all three temperatures, the falling headform did not penetrate the laminate and the polyurethane layer did not tear. The Severity Index results for 2 foot by 3 foot (6.096 × $10^{-1}$ m by 9.144 × $10^{-1}$ m) bilayer laminates prepared as described above at an impact speed of 19 miles per hour (30.571 km/hr) were as follows:

| 30° F. (−1° C.) | 70° F. (21° C.) | 110° F. (43° C.) |
| --- | --- | --- |
| 370 | 257 | 170 |

The adhesion of the polyurethane to glass laminated under the above conditions was about 4 to 6 pounds per lineal inch (7.004 × $10^{+2}$ to 10.506 × $10^{+2}$ N/m) as determined by the 90° Peel Test according to the NASA TECH BRIEF 65-10173. When the bilayer laminate was prepared as described above and put in a high humidity chamber at 100 percent relative humidity, 50° C., the degree of adhesion between the polyurethane and the glass was unchanged after 30 days.

Both the free poly(caprolactone-urethane) sheet and the bilayer laminates prepared as described above were non-blooming, that is, they developed no surface haze after being exposed to the atmosphere for 145 days at 25° C. and 50 percent relative humidity.

EXAMPLE I-A

The following is the preferred embodiment of the invention:

A poly(lactone-urethane) interlayer was prepared from the following charge:

| Ingredient | Moles |
| --- | --- |
| 4,4'-methylene-bis-(cyclohexyl isocyanate) | 2.386 |
| polycaprolactone diol | 1.000 |
| polycaprolactone diol containing 1 percent by weight of dissolved butyl stannoic acid catalyst | 0.009 |
| 1,4-butanediol | 1.377 |
| gamma-glycidoxypropyltrimethoxysilane | 0.12 percent by weight[1] |
| stearyl acid phosphate | 0.004 percent by weight[1] |

[1]Percent by weight based on total formulation weight.

The polycaprolactone was prepared by polymerizing epsiloncaprolactone (89.19 percent) with about 10.81 percent of 1,4-butanediol initiator. The resulting polycaprolactone diol had a molecular weight of 1040. The polycaprolactone diol was melted at 60° C. and mixed with a similar polycaprolactone diol but one having a molecular weight of 1060 and which contained the dissolved butyl stannoic acid catalyst and the gamma-glycidoxypropyltrimethoxysilane and the mixture charged to a reaction kettle. The catalyst, butyl stannoic acid, was present in an amount of 0.0053 percent by weight based on total formulation weight. The ingredients in the reaction kettle were heated to a temperature of 60° C. for 30 minutes under 2-3 millimeters of mercury pressure to degas the mixture and to remove trace amounts of volatiles. The ingredients were allowed to cool to 43° C., and the vacuum was released by introducing pre-purified nitrogen. Anhydrous 1,4-butanediol at a temperature of 43° C. was then added with stirring. Immediately following, the HYLENE W containing the stearyl acid phosphate was added to the reaction kettle while stirring. The mixture was degassed for 8 minutes while holding the temperature at 43° C. at a pressure of about 2 millimeters of mercury. The material was then cast in place between two 14 inch by 14 inch by ⅛ inch (35.56 × $10^{-2}$ m by 35.56 × $10^{-2}$ m by 0.3175 × $10^{-2}$ m) float glass sheets which were fitted with gaskets on three sides. Both glass sheets had polytetrafluoroethylene release coatings on their faces which contacted the polyurethane. The spacing between the sheets was approximately 30 mils (76.20 × $10^{-5}$ m). The casting cell was preheated to a temperature of about 143° C. before casting and the cast assemblies were given a 7-hour cure at 143° C. After curing for this period and temperature, the cells were permitted to cool to room temperature and a polyurethane sheet was then removed from the casting cell and aged one week at about 20° C. and one atmosphere of pressure. The cured polyurethane was essentially free of NCO groups at a urethane content calculated to be 15.65 percent and an inherent viscosity of about 1.244. The polyurethane sheet was trimmed in place on a 12 inch by 12 inch by ⅛ inch (30.48 × $10^{-2}$ m by 30.48 ×

$10^{-2}$ m by 0.3175 × $10^{-2}$ m) float glass sheet and a piece of TEDLAR ® (registered trademark of E. I. du Pont de Nemours and Company) film was placed over the polyurethane and the 12 inch by 12 inch by ⅛ inch (30.48 × $10^{-2}$ m by 30.48 × $10^{-2}$ m by 0.3175 × $10^{-2}$ m) float glass sheet was placed over the TEDLAR film. The assembly was then placed in a MYLAR ® (registered trademark of E. I. du Pont de Nemours and Company) bag and the bag and its contents placed in an evacuation chamber and evacuated at approximately 40 millimeters of mercury at room temperature to prepress the assembly. The vacuum bag assembly was then placed in an oil autoclave for 45 minutes at 150° C. and 200 pounds per square inch (1,378,800 Pa) pressure to laminate the assembly. After autoclaving, the assembly was broken apart to yield a 12 inch by 12 inch (30.48 × $10^{-2}$ m by 30.48 × $10^{-2}$ m) bilayer laminate, which was then subjected to a 5-pound (22.675 × $10^{-1}$ kg) falling ball test as described above to determine the energy-absorbing properties of the poly(caprolactone-urethane) interlayer. Test results are given below for poly(caprolactone-urethane) thickness of 30 mils (76.20 × $10^{-5}$ m).

| Mean Penetration Velocity (5-Pound (22.675 × $10^{-1}$ kg) Ball Drop) | | |
|---|---|---|
| 0° F. (−18° C.) | 70° F. (21° C.) | 120° F. (49° C.) |
| 35.85 mph* (57.68265 km/hr) | 35.85 mph (57.68265 km/hr) | 30 mph (48.270 kg/hr) |

*Limit of the machine. Ball drop height was 43 feet (131.064 × $10^{-1}$ m).

The adhesion of the polyurethane to glass laminated under the above conditions was about 4 to 6 pounds per lineal inch (7.004 × $10^{+2}$ to 10.506 × $10^{+2}$ N/m) as determined by the 90° Peel Test according to NASA TECH BRIEF 65-10173. When a bilayer laminate was prepared as described above and put in a high humidity chamber at 100 percent relative humidity, 50° C., the degree of adhesion between the polyurethane and the glass was unchanged after 30 days.

Both the free poly(caprolactone-urethane) sheet and the bilayer laminates prepared as described above were non-blooming, that is, they developed no surface haze after being exposed to the atmosphere for 145 days at 25° C. and 50 percent relative humidity.

EXAMPLES II − X

A series of poly(caprolactone-urethanes) were prepared as generally described in Example I with the exception that the hydroxyl number of the polycaprolactone diol was varied from 224 to 37 as shown in the table below:

Table I

| | Poly(caprolactone-urethanes) | |
|---|---|---|
| Example No. | Hydroxyl Number of the Polycaprolactone Diol | Number Average Molecular Weight of the Polycaprolactone |
| II | 224 | 500 |
| III | 160 | 700 |
| IV | 140 | 800 |
| V | 112 | 1000 |
| VI | 93.5 | 1200 |
| VII | 83 | 1350 |
| VIII | 75 | 1500 |
| IX | 56 | 2000 |
| X | 37 | 3000 |

The polyurethanes in Examples II to X above were prepared with 4,4′-methylene-bis-(cyclohexyl isocyanate) (HYLENE W) polycaprolactone diol and 1,4-butanediol in ratios so as to give a 15 percent urethane content and an NCO/OH weight ratio of 1.00.

The poly(caprolactone-urethanes) of Examples II, V and IX were used in the preparation of 12 inch by 12 inch (30.48 × $10^{-2}$ m by 30.48 × $10^{-2}$ m) bilayer glass polyurethanes as described in Example I. The glass was ⅛ inch (0.3175 × $10^{-2}$ m) thick float glass and the poly(caprolactone-urethane) interlayer was about 0.040 inch (0.1016 × $10^{-2}$ m) thick. The energy-absorbing properties and bloom development of these poly(caprolactone-urethanes) are reported in Table II below.

Table II

| | | | Energy-Absorbing Properties and Bloom Development of Poly(caprolactone-urethanes) | | | |
|---|---|---|---|---|---|---|
| | | | Mean Penetration Velocity in miles per hour (km/hr) | | | |
| Example No. | Hydroxyl Number of Polycaprolactone Diol | Number Average Molecular Weight of Polycaprolactone Diol | 5-Pound (22.675 × $10^{-1}$ kg) Ball Drop Impact | | | Bloom[1] |
| | | | 0° F. (−18° C.) | 70° F. (21° C.) | 120° F. (49° C.) | |
| II | 224 | 500 | * | * | * | no bloom after 100 days |
| V | 112 | 1000 | 27 (43.443) | 35 (56.315) | 21 (33.789) | no bloom after 100 days |
| IX | 56 | 2000 | 30 (48.270) | 37.5 (60.3375) | 27 (43.443) | bloom after 16 days |

*Interlayer was not tested for ball drop because it was low in tensile strength, was easily ripped and would obviously have poor energy-absorbing properties.
[1]The test for bloom was accomplished by storing the bilayer laminates in a conditioning room at 18° C. and 10 percent relative humidity at about one atmosphere of pressure until bloom was visually detected.

EXAMPLES XI − XV

To show the effect that the structure of the caprolactone ring opener has on energy-absorbing properties of poly(caprolactoneurethane) interlayers, the following experiments were conducted:

A series of poly(caprolactone-urethane) bilayer laminates were prepared as described in Example I with the exception that the epsilon-caprolactone was ring opened with the various diols as shown in Table III below, instead of 1,4-butanediol of Example I.

Table III

| | Effect of Ring Opener Structure on Energy-Absorbing Properties of Poly(caprolactone-urethanes) | | | |
|---|---|---|---|---|
| | | Mean Penetration Velocity in miles per hour (km/hr) | | |
| Example No. | Ring Opener | 5-Pound (22.675 × $10^{-1}$ kg) Ball Drop | | |
| | | 0° F. (−18° C.) | 70° F. (21° C.) | 120° F. (49° C.) |
| XI | 1,6-hexanediol | 22 (35.398) | 35 (56.315) | 21 (33.789) |
| XII | ethylene glycol | 22 (35.398) | 37.5 (60.3375) | 22 (35.398) |
| XIII | diethylene glycol | 23 (37.007) | 32 (51.488) | 20 (31.180) |
| XIV | neopentyl glycol | 13 (20.917) | 37.5 (60.3375) | 23 (37.007) |

Table III-continued
Effect of Ring Opener Structure on Energy-Absorbing
Properties of Poly(caprolactone-urethanes)

| Example No. | Ring Opener | Mean Penetration Velocity in miles per hour (km/hr) 5-Pound (22.675 × $10^{-1}$ kg) Ball Drop | | |
|---|---|---|---|---|
| | | 0° F. (−18° C.) | 70° F. (21° C.) | 120° F. (49° C.) |
| XV | propylene glycol | 13 (20.917) | 37.5 (60.3375) | 27 (43.443) |

The polyurethane interlayers in the above examples were prepared with 4,4'-methylene-bis-(cyclohexyl isocyanate) (HYLENE W), polycaprolactone diol and 1,4-butanediol in ratios so as to give 15 percent urethane content and an NCO/OH ratio of about 1.00. In the above examples, the mole ratio of epsilon-caprolactone to ring opener was the same as that used in Example I, that is, about 8.2 to 1.0. In the above examples, the molecular weight of the polycaprolactone diol was approximately 1000 and no bloom was evidenced after at least 100 days in the conditioning room such as described in working Examples II-X.

EXAMPLE XVI

To show the effect that structure of the caprolactone has on energy-absorbing properties of resultantly prepared poly(caprolactoneurethane) interlayers, a poly(caprolactone-urethane) bilayer laminate was prepared as described in working Example I with the exception that methyl-epsilon-caprolactone was employed instead of epsilon-caprolactone. The energy-absorbing properties of the poly(caprolactone-urethane) interlayer prepared generally as in Example I are shown below.

| 5-Pound (22.675 × $10^{-1}$ kg) Ball Drop Impact (mph) (km/hr) | | |
|---|---|---|
| 0° F. (−18° C.) | 70° F. (21° C.) | 120° F. (49° C.) |
| 9 (14.481) | 30 (48.270) | 19.5 (31.3755) |

Although the bilayer laminate such as described above evidenced no bloom after storing for 24 days as described in working Examples II through X, a stored sample of the free sheeting developed an internal haze after being stored for 21 days in the conditioning room.

EXAMPLE XVII

A poly(lactone-urethane) interlayer was prepared from the following charge:

| Ingredient | Moles |
|---|---|
| 4,4'-methylene-bis-(cyclohexyl isocyanate) (HYLENE W) | 2.103 |
| poly(ester-lactone) diol | 1.000 |
| poly(ester-lactone) diol containing 1% by weight of dissolved butyl stannoic acid catalyst | 0.009 |
| 1,4-butanediol | 1.094 |
| gamma-glycidoxypropyltrimethoxysilane | 0.20 percent by weight[1] |
| stearyl acid phosphate | 0.04 percent by weight[1] |

[1]Percent by weight based on total formulation weight.

The poly(ester-lactone) diol was prepared by polymerizing epsilon-caprolactone (50 weight percent) with about 50 weight percent of polybutylene adipate diol having a molecular weight of about 500 and a hydroxyl number of 224, in the presence of 0.02 percent by weight isopropyl titanate catalyst. The polybutylene adipate diol contained 200 parts per million butyl stannoic acid catalyst. The resulting poly(ester-lactone) diol had a hydroxyl number of about 112 and a number average molecular weight of about 1000. The poly(lactone-ester) diol remained a liquid at room temperature for many days and was mixed with the poly(ester-lactone) diol containing the butyl stannoic acid catalyst and with gamma-glycidoxypropyltrimethoxysilane and the mixture charged to a glass reaction kettle at a temperature of 110° F. (43° C.). The ingredients in the reaction kettle were degassed under 2-3 millimeters of mercury pressure to remove trace amounts of volatiles and the mix was allowed to cool to 75° F. (24° C.). The vacuum was released by introducing prepurified nitrogen. Anhydrous 1,4-butanediol at a temperature of 75° F. (24° C.) was added while still stirring. Immediately following, 4,4'-methylene-bis-(cyclohexyl isocyanate) in a stereo:isomer ratio of 55 percent trans and 45 percent cis at 75° F. (24° C.) containing the stearyl acid phosphate was added to the reaction kettle while stirring. The mixture was then degassed at least 8 minutes with the temperature holding at 75° F. (24° C.) at a pressure of about 2 millimeters of mercury. The vacuum was then broken by dry nitrogen. The material which had a pot life of more than 18 hours was cast in place between two 14 inch by 14 inch by ⅛ inch (35.56 × $10^{-2}$ m by 35.56 × $10^{-2}$ m by 0.3175 × $10^{-2}$ m) float glass sheets which were fitted with gaskets on three sides. Both glass sheets had polytetrafluoroethylene release coatings on their faces which contacted the polyurethane. The spacing between the sheets was approximately 40 mils (101.60 × $10^{-5}$ m). The casting cell was preheated to a temperature of about 143° C. before casting and the cast assemblies were given a 7-hour cure at 143° C. After curing for this period and temperature, the cells were permitted to cool to room temperature and the poly(lactone-urethane) sheet was then removed from the casting cell and aged 1 week at 25° C. and one atmosphere of pressure. The cured poly(lactone-urethane) was essentially free of NCO groups and had a urethane content calculated to be about 15 percent. The polyurethane sheet was trimmed and placed on a 12 inch by 12 inch by ⅛ inch (30.48 × $10^{-2}$ m by 30.48 × $10^{-2}$ m by 0.3175 × $10^{-2}$ m) float glass sheet and a piece of TEDLAR film was placed over the polyurethane and a 12 inch by 12 inch by ⅛ inch (30.48 × $10^{-2}$ m by 30.48 × $10^{-2}$ m by 0.3175 × $10^{-2}$ m) float glass sheet was placed over the TEDLAR film. The assembly was then placed in a MYLAR bag and the bag and its contents placed in an evacuation chamber and evacuated at approximately 40 millimeters of mercury at room temperature to prepress the assembly. The vacuum bag assembly was then placed in an oil autoclave for 45 minutes at 150° C. and 200 pounds per square inch (1,378,800 Pa) pressure to laminate the assembly. After autoclaving, the assembly was broken apart to yield a 12 inch by 12 inch (30.48 × $10^{-2}$ m by 30.48 × $10^{-2}$ m) bilayer laminate. The laminate was then subjected to a 5-pound (22.675 × $10^{-1}$ kg) falling ball test as described above to determine the energy-absorbing properties of the laminate structure. The results are given below for polyurethane thickness of 40 mils (101.60 × 10$^{-5}$ m).

| Mean Penetration Velocity (5-Pound (22.675 × 10$^{-1}$ kg) Ball Drop | | |
|---|---|---|
| 0° F. (−18° C.) | 70° F. (21° C.) | 120° F. (49° C.) |
| 31 mph (49.879 km/hr) | >37.5 mph* (>60.3375 km/hr) | 27 mph (43.443 km/hr) |

*37.5 mph (60.3375 km/hr) is the upper limit of the testing apparatus.

The adhesion of the polyurethane to glass laminated under the above conditions was about 4 to 6 pounds per lineal inch (7.004 × 10$^{+2}$ to 10.506 × 10$^{+2}$ N/m) determined by the 90° Peel Test according to the NASA TECH BRIEF 65-10173. When the bilayer laminate was prepared as described above and put in a high humidity chamber at 100 percent relative humidity, 120° F. (49° C.), the degree of adhesion between the polyurethane and the glass was unchanged after 30 days.

Both the free poly(lactone-urethane) sheet and the bilayer laminate prepared as described above were non-blooming, that is, they developed no surface haze after being exposed to the atmosphere for 150 days at 25° C. and 50 percent relative humidity.

EXAMPLE XVIII

A poly(lactone-urethane) interlayer was prepared from the following charge:

| Ingredient | Equivalent Ratio |
|---|---|
| 4,4'-methylene-bis-(cyclohexyl isocyanate) (HYLENE W) | 4.397 |
| poly(ester-lactone) diol | 1.903 |
| poly(ester-lactone) diol containing 1% by weight of dissolved butyl stannoic acid catalyst | 0.097 |
| 1,4-butanediol | 1.957 |
| trimethylol propane | 0.440 |
| gamma-glycidoxypropyltrimethoxysilane | 0.10 percent by weight[1] |
| stearyl acid phosphate | 0.06 percent by weight[1] |

[1]Percent by weight based on total formulation weight.

The poly(ester-lactone) diol was prepared by polymerizing epsilon-caprolactone (50 weight percent) with about 50 weight percent of polybutylene adipate diol having a molecular weight of about 500 and a hydroxyl number of about 224 in the presence of 0.2 percent by weight isopropyl titanate catalyst. The polybutylene adipate diol contains about 200 parts by million butyl stannoic acid catalyst. The resulting poly(ester-lactone) diol had a hydroxyl number of about 112 and a number average molecular weight of about 1000. The poly(lactone-ester) diol remained a liquid at room temperature for many days and was mixed with the poly(ester-lactone) diol containing the butyl stannoic acid catalyst, and with gamma-glycidoxypropyltrimethoxysilane and the mixture charged to a glass reaction kettle at a temperature of 110° F. (43° C.). The ingredients in the reaction kettle were degassed under 2-3 millimeters of mercury pressure to remove traces of volatiles, and the mix was allowed to cool to 75° F. (24° C.). The vacuum was released by introducing prepurified nitrogen. An anhydrous mixture of 1,4-butanediol and trimethylol propane at a temperature of 75° F. (24° C.) was added with stirring. Immediately following, 4,4'-methylene-bis-(cyclohexyl isocyanate) in a stereo:isomer ratio of 55 percent trans and 45 percent cis at 75° F. (24° C.) containing the stearyl acid phosphate was added to the reaction kettle while stirring. The mixture was then degassed at least 8 minutes with the temperature holding at 75° F. (24° C.) at a pressure of about 2 millimeters of mercury. The vacuum was then broken by dry nitrogen. The material which had a pot life of more than 18 hours was cast in place between two 14 inch by 14 inch by ⅛ inch (35.56 × 10$^{-2}$ m by 35.56 × 10$^{-2}$ m by 0.3175 × 10$^{-2}$ m) float glass sheets which were fitted with gaskets on three sides. Both glass sheets had polytetrafluoroethylene release coatings on their faces which contacted the polyurethane. The spacing between the sheets was approximately 40 mils (101.60 × 10$^{-5}$ m). The casting cell was preheated to a temperature of about 143° C. before casting and the cast assemblies were given a 7-hour cure at 143° C. After curing for this period and temperature, the cells were permitted to cool to room temperature and the poly(lactone-urethane) sheet was then removed from the casting cell and aged 1 week at 25° C. and one atmosphere of pressure. The cured poly(lactone-urethane) was essentially free of NCO groups and had a urethane content calculated to be about 15 percent. The polyurethane sheet was elastoplastic, and did not snap back as a true elastomer when stretched. It was clear, flexible, and essentially non-adhesive at room temperature.

EXAMPLE XIX

A poly(lactone-urethane) interlayer, similar to that of Example XVII, was prepared, with the exception that the polyester diol was one which was prepared by polymerizing epsilon-caprolactone (50 weight percent) with about 50 weight percent of poly(1,2-propylene adipate) diol having a number average molecular weight of about 500 and a hydroxyl number of about 224. The resulting copolyester diol had a number average molecular weight of about 1000 and a hydroxyl number of about 112.

Twelve inch by 12 inch (30.48 × 10$^{-2}$ m by 30.48 × 10$^{-2}$ m) bilayer laminates were prepared, as described in Example XVII, of 40 mil (101.60 × 10$^{-5}$ m) thick interlayer and ⅛ inch (0.3175 × 10$^{-2}$ m) thick float glass. The adhesion of the poly(lactone-urethane) to glass was about 4 to 6 pounds per lineal inch (7.004 × 10$^{+2}$ to 10.506 × 10$^{+2}$ N/m) determined by the 90° Peel Test (NASA TECH BRIEF 65-10173). The laminate was subjected to 5-pound (22.675 × 10$^{-1}$ kg) falling ball test to determine mean penetration velocities as described in Example XVII. The results are given below.

| Mean Penetration Velocity (5-Pound (22.675 × 10$^{-1}$ kg) Ball Drop | | |
|---|---|---|
| 0° F. (−18° C.) | 70° F. (21° C.) | 120° F. (49° C.) |
| <9.5 mph** (<15.2855 km/hr) | >37.5 mph* (>60.3375 km/hr) | 22 mph (35.398 km/hr) |

*37.5 mph (60.3375 km/hr) is the upper limit of the testing apparatus.
**9.5 mph (15.2855 km/hr) is the lower limit of the testing apparatus (interlayer very brittle).

The above mean penetration velocities when compared with those of Example XVII, show the effects that alkyl substitution has on the energy-absorbing properties of the bilayer laminates. Pendant alkyl substitution in the poly(lactone-ester) moiety of the polyurethane results in a very brittle interlayer at 0° F. (−18° C.).

We claim:
1. A non-blooming energy-absorbing polyurethane interlayer comprising the polymerizate of:
(A) an organic polyisocyanate,

(B) a polylactone polyol having a hydroxyl number within the range of 62 to 140 inclusive formed from polymerizing an unsubstituted lactone having 6 to 8 carbon atoms with an organic polyhydroxyl-containing compound selected from the class consisting of:

(1) aliphatic diols free of alkyl substitution and oxyalkylated products of these diols, (2) a hydroxyl-terminated polyester having a hydroxyl number below 600 formed from an organic polycarboxylic acid containing from 3 to 10 carbon atoms and aliphatic diols free of alkyl substitution and oxyalkylated products of these diols, (C) a compound containing at least two active hydrogens per molecule reactive with the isocyanate group having a molecular weight less than 250 selected from the class consisting of aliphatic diols free of alkyl substitution, aliphatic triols and mixtures thereof; the equivalent ratio of (A)/(B)/(C) being within the following range: 1.35–4.4/1.000/0.5–3.

2. The interlayer of claim 1 in which the organic polyisocyanate is an organic diisocyanate.

3. The interlayer of claim 2 which the organic diisocyanate is an aliphatic diisocyanate.

4. The interlayer of claim 3 in which the aliphatic diisocyanate is a cycloaliphatic diisocyanate.

5. The interlayer of claim 4 in which the cycloaliphatic diisocyanate is 4,4'-methylene-bis-(cyclohexyl isocyanate), wherein about 55 percent of the NCO groups are trans and 45 percent of the NCO groups are cis.

6. The interlayer of claim 1 in which the aliphatic diol (1) is a hydroxy-terminated alkylene diol containing from 2 to 10 carbon atoms.

7. The interlayer of claim 6 in which the alkylene diol is selected from the class consisting of ethylene glycol, 1,4-butanediol, 1,5-pentanediol and 1,6-hexanediol.

8. The interlayer of claim 1 in which the hydroxyl-terminated polyester (2) has a hydroxyl number between 140 to 300.

9. The interlayer of claim 1 in which the aliphatic diol used to prepare the hydroxy-terminated polyester (2) is selected from the class consisting of ethylene glycol, 1,4-butanediol, 1,5-pentanediol and 1,6-hexanediol.

10. The interlayer of claim 1 in which the unsubstituted lactone is epsilon-caprolactone.

11. The interlayer of claim 1 which has a thickness of from 15 to 60 mils ($38.10 \times 10^{-5}$ to $152.40 \times 10^{-5}$ m).

12. The interlayer of claim 1 in which the compound (C) is an aliphatic polyol free of alkyl substitution.

13. The interlayer of claim 12 in which the aliphatic polyol is selected from the class consisting of diols, triols and mixtures thereof.

14. The interlayer of claim 13 in which the aliphatic polyol is selected from the class consisting of 1,4-butanediol and trimethylolpropane.

15. The interlayer of claim 1 which is of substantially uniform thickness with the rate of change in thickness of the interlayer being sufficiently small to produce a diopter of less than 0.006.

16. The interlayer of claim 1 which has a minimum light transmission of greater than 70 percent and has less than 2 percent haze.

17. The polyurethane interlayer of claim 1 which has a mean penetration velocity at 0° F., 70° F. and 120° F. (−18° C., 21° C. and 49° C.) of at least 20 miles per hour (32.180 km/hr) when an approximately 0.030–0.040 inch ($0.0762 \times 10^{-2}$ to $0.1016 \times 10^{-2}$ m) thick sample of the polyurethane interlayer is laminated to a ⅛ inch ($0.3175 \times 10^{-2}$ m) thick 12 inch by 12 inch ($30.48 \times 10^{-2}$ m by $30.48 \times 10^{-2}$ m) float glass sheet to form a bilayer laminate and the laminate held rigid and impacted on the polyurethane side with a 5-pound ($22.675 \times 10^{-1}$ kg) freely falling steel ball.

* * * * *